A. C. MOSS.
AUTOGRAPHIC CAMERA.
APPLICATION FILED DEC. 19, 1917. RENEWED AUG. 2, 1920.
1,363,899.
Patented Dec. 28, 1920.
2 SHEETS—SHEET 1.
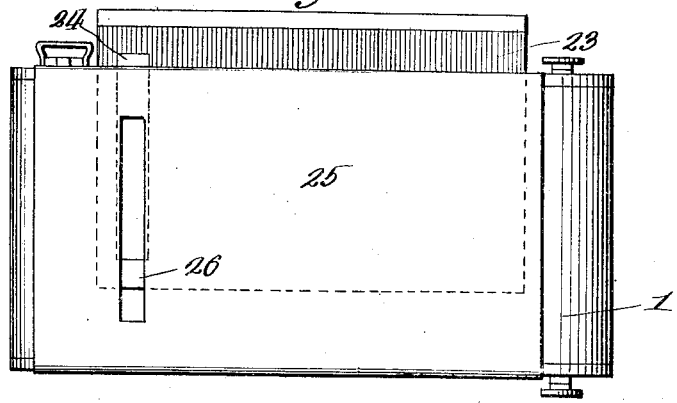
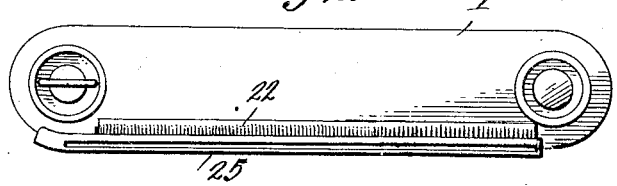
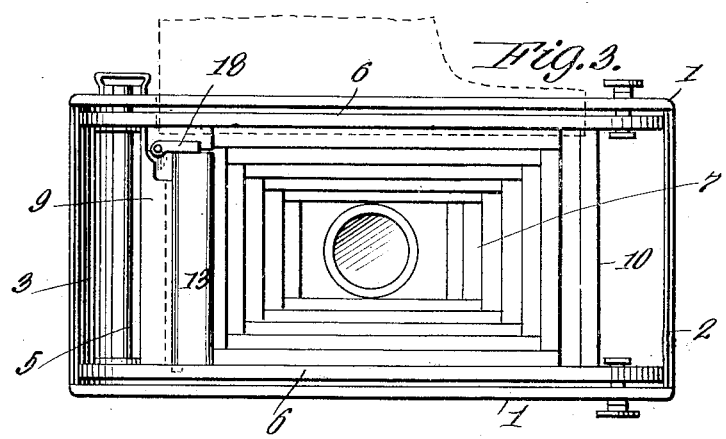
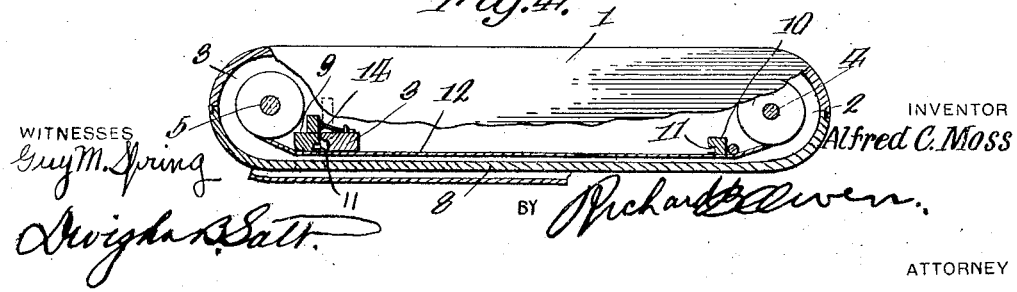
INVENTOR
Alfred C. Moss
WITNESSES
BY
ATTORNEY A. C. MOSS.
AUTOGRAPHIC CAMERA.
APPLICATION FILED DEC. 19, 1917. RENEWED AUG. 2, 1920.
1,363,899.
Patented Dec. 28, 1920.
2 SHEETS—SHEET 2.
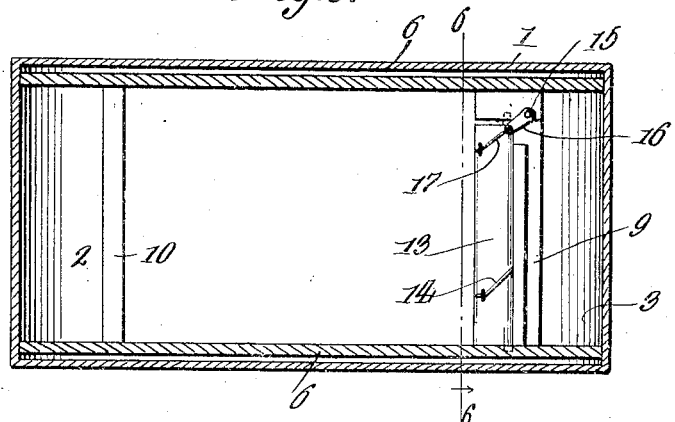
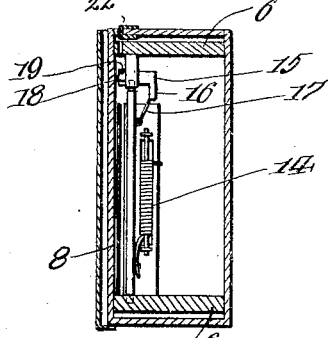
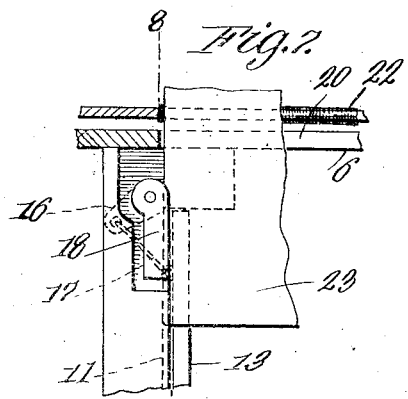
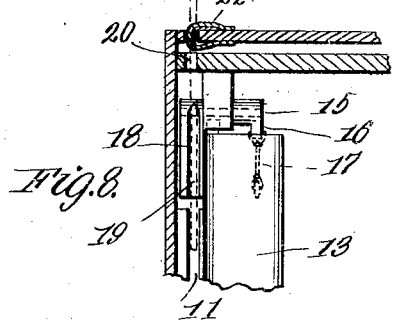
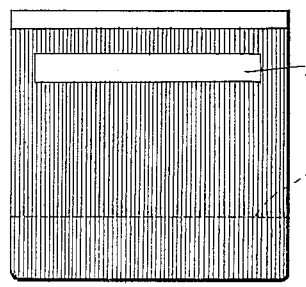
WITNESSES
Guy M. Spring
Dwight R. Galt
INVENTOR
Alfred C. Moss
BY Richard B. Owen.
ATTORNEY

UNITED STATES PATENT OFFICE.

ALFRED C. MOSS, OF OGDEN, UTAH.

AUTOGRAPHIC CAMERA.

1,363,899.  Specification of Letters Patent.  Patented Dec. 28, 1920.

Application filed December 19, 1917, Serial No. 207,937. Renewed August 2, 1920. Serial No. 400,890.

*To all whom it may concern:*

Be it known that I, ALFRED C. MOSS, a citizen of the United States, residing at Ogden, in the county of Weber and State of Utah, have invented certain new and useful Improvements in Autographic Cameras, of which the following is a specification.

This invention relates to photographic cameras or holders for sensitized material for use in connection with spools or cartridges of photographic film, whereby the user is enabled to cause designation of memoranda relating to the exposures made or to be made, by light-printing the same on the film so as to become apparent upon development thereof in the usual manner. The invention is particularly applicable to that class of cameras or holders disclosed in my Patent Number 1,252,605, granted January 8th, 1918, being an improvement upon the means and method for attaining the ends set forth therein.

One of the principal objects of this invention is to provide means whereby inscriptions may be light-printed upon the sensitized member either longitudinally or laterally thereof, so that the inscriptions or memoranda may be made to appear at the bottom of the sensitized member.

Further objects of the invention are to provide an inscription transmitting apparatus which is constructed and arranged in such manner as to involve no change in the shape, size or general makeup of film cameras now in use; a mechanism of the character mentioned which is so assembled within the camera casing and is so operated as to minimize the opportunity for spoiling the sensitized member or rendering the same light struck; which operates automatically when not in use to preserve a part of the film for inscription purposes; which is positive in operation; and which may efficiently be used by those unfamiliar with the construction of the camera.

With these objects in view, together with others which will appear as the description proceeds, the invention resides in the novel formation, combination, and arrangement of parts, all as will be described more fully hereinafter, illustrated in the drawings, and particularly pointed out in the claims.

In the drawings:—

Figure 1 is a rear elevation of a camera constructed in accordance with the invention and illustrating the slide case and one of the slides used in carrying out the invention, Fig. 2 is a top plan view of the improved camera, Fig. 3 is a rear elevation of the camera with the rear wall removed, Fig. 4 is a top plan view, parts broken away, of the camera and illustrating a portion of the improved mechanism, Fig. 5 is a longitudinal sectional view taken through the camera and looking toward the rear thereof, Fig. 6 is a sectional view taken on line 6—6 of Fig. 5, Fig. 7 is an enlarged fragmentary view illustrating the manner in which a slide is introduced into the camera and the manner in which the slide actuates the shutter, Fig. 8 is a sectional view taken substantially upon line 8—8 of Fig. 7, and Fig. 9 is an elevation, on a reduced scale, of one of the slides for use in carrying out the invention.

The invention is shown as applied to a well known form of roll holding camera, embodying the casing 1 provided at the ends with chambers 2 and 3 constituting film receptacles, and in which the supplying spool 4 and takeup spool or roll 5 are respectively located. Arranged between the film chambers or receptacles and near the rear of the casing is the frame 6 having the usual exposure opening therein, and to the edges of this frame is attached the rear portion of the bellows 7. The rear of the casing and the film chambers are adapted to be closed or covered by a removable cover, wall or back 8, having its edges arranged to coöperate with the casing to produce a light tight joint, and any approved means, not shown, may be provided for securing the cover securely in place upon the camera body.

Extending transversely across the frame 6 and adjacent the film chambers 2 and 3 are bars 9 and 10, each of which is provided in one face with a longitudinally extending groove 11. These grooves face toward the center of the camera case, and are arranged adjacent the rear edges of their respective bars. The film indicated at 12 passes from one spool to the other, and travels close to or in engagement with the rear faces of the bars 9 and 10.

A shutter 13 is pivoted at its end in the frame 6 adjacent the post or bar 9, and is capable of swinging toward and away from the sensitized member indicated at 12. The shutter 13 is of relatively narrow width, and normally covers a portion of the film so as to prevent the same becoming exposed or light struck when a picture is being taken, the said shutter being held normally in closed position by a spring indicated at 14.

Rotatably mounted in the camera case adjacent the bar 9 and at the upper end of the case is a shaft 15, one end of which is provided with an arm 16 connected as by means of a cord 17 to the shutter 13, so that rotary movement of the shaft in one direction will cause the said shutter to swing to open position, or away from the sensitized element 12. The opposite end of the shaft 15 is provided with a lever 18, having a groove 19 in its upper surface and extending longitudinally thereof. This lever 18 is disposed directly above the post or bar 9, and when moved inwardly to its limit the groove 19 therein registers with the groove 11 in the said bar 9.

When the shutter 13 is closed, or is against the film 12 as shown in Fig. 4, the arm 18 will be disposed parallel to the path of travel of the sensitized member, as shown in Fig. 3. The relative movements of these elements are carried out by the spring 14 and the connection 17 between the shutter 13 and the arm 16. When the arm 18 is depressed or moved to the position shown in Fig. 7, the arm 16 will have moved rearwardly, and will have drawn the shutter 13 to open position by means of the connecting cord 17. When in this position, opening of the lens of the camera will cause the portion of the film which was before covered by the shutter 13 to be exposed. Immediately upon releasing the lever 18, the spring 14 moves the shutter to closed position and rocks the shaft 15 until the arm 18 is disposed parallel to the top and bottom of the camera case.

The side of the camera at the rear end thereof is provided with a longitudinally disposed slot 20, which slot communicates with the interior of the camera and is rendered light tight by the filler or packing 22. This slot is of a length equal to the distance between the bars 9 and 10, and is located directly above the slots 11 in the said bars, so that a slide inserted through said slot will engage at its ends in the oppositely facing grooves 11 in the said bars.

The slide for use in connection with the above described shutter and shutter actuating mechanism is shown in Fig. 1 of the drawings, partly inserted in the camera. This slide, 23, is formed of any desired material, and is of a length equal to that of the slot 20. This slide is also sufficiently deep or wide to wholly cover that portion of the sensitized member 12 between the bars 9 and 10, and is provided in one end with a laterally disposed translucent portion 24. This translucent portion may be roughened so as to receive an inscription with a lead pencil, or, if desired, with ink, and all of the surface of the slide is opaque except the said portion 24. This portion 24 is of a width substantially equal to the width of the shutter 13, and is so positioned upon the slide that when the latter is inserted within the camera, the said translucent portion will be disposed directly over that portion of the film which was before protected by the shutter 13.

When it is desired to identify a picture taken with the camera, the latter is operated so that the desired exposure is made upon the sensitized member. When the picture taking exposure is made, the shutter 13 will be so positioned as to cover a portion of the film. After the picture is taken, the inscription to be imprinted upon the film is written upon the translucent portion 24 of the slide 23, and then the said slide is inserted in the camera as shown in Fig. 1. As the slide moves inwardly, the lower edge of the same engages the lever 18, the said lower edge of the slide engaging in the groove 19 in the said lever. Inward pressure applied to the slide will then cause the lever 18 to rock the shaft 15, whereupon the shutter 13 is opened. As the slide moves inwardly, the lever 18 will rock into a position parallel with the bar 9, and as the groove 19 in the lever 18 will then be in communication with the groove 11 of the bar 9, the edges of the slide will pass into the said last mentioned groove. After the slide has been moved to the limit of its inward movement, the translucent portion thereon, upon which the inscription is located, will be positioned between the unexposed portion of the film, and the camera lens. The remainder of the film will, however, be protected from exposure by the opaque part of the slide. The camera may then be pointed at a plain white object or at the sky and the lens thereof opened, whereupon the inscription upon the translucent portion 24 will be imprinted upon the film. The slide 23 may then be removed from the camera and placed in the pocket 25 upon the rear of the camera, the said pocket being provided for the accommodation of such slides. Immediately upon removal of the slide 23 from the camera, the spring 14 will move the shutter 13 to closed position, and the actuating shaft for the said shutter will be rotated as has been before described.

The pocket 25 upon the rear of the camera may be provided with an elongated slot 26, so located that the translucent portion 24 of the said slide will be disposed directly under the same. By so constructing the pocket, inscriptions upon the slide 24 may be made through the slot 26 without removing the slide from the pocket.

It will be noted particularly by referring to Fig. 3 of the drawings, that the lever 18 is disposed below the upper edge of the camera, thus requiring the slide to enter the camera an appreciable distance before the lever is engaged and moved inwardly. When it is desired to inscribe the bottom of a film with the picture thereon taken lengthwise, a slide such as that shown in Fig. 9 of the drawings is used. This slide is provided with a translucent portion 27 adjacent the upper end and parallel with the upper longitudinal edge thereof. The slide shown in Fig. 9 may also be provided with a guide line indicated at 28 adjacent its lower edge, which line will indicate the depth to which the slide is to be introduced into the camera to cover and protect a sufficient portion of the film which will later receive the inscription written upon surface 27 of slide 9.

When it is desired to take a picture lengthwise of the camera, and to make an inscription at the bottom thereof, the slide shown in Fig. 9 is introduced into the camera slot 20 a distance only sufficient to obscure one of the longitudinal edges of the film, as indicated by the guide line 28. With the slide so positioned, the picture is taken in the usual manner, and then the slide may be moved all the way into the camera. The translucent portion 27 will then register with that area of the film, which was protected from light rays when the picture was taken by the lower portion of the said slide. The camera may then be pointed at a white object or the sky and the lens opened, whereupon the inscription which has previously been made upon the translucent portion 27 will be imprinted upon the film.

From the foregoing it is obvious that I have provided a mechanism by which the desired inscription may be light printed upon the sensitized member, either laterally thereon, or longitudinally, and danger of the film containing the picture becoming fogged is eliminated.

While the present is a disclosure of my invention as applied to roll-film cameras, yet its application is not restricted to such cameras alone, as it is obvious that the same mechanism can be successfully applied and operated upon film-pack or plate cameras.

I claim:—

1. In combination with a camera, a pocket permanently placed upon the outside of said camera, an inscription slide designed when not in use to be inserted in said pocket, and said pocket having an opening in its face substantially of the area of the inscription space upon the slide to permit of the writing of the title upon the slide while the slide is in said pocket.

2. In combination with a camera casing, a shutter in said casing at one end thereof, a guide adjacent said shutter, a lever mounted for rocking movement within said casing and having its free end disposed in alinement with said guide, the upper face of said lever being grooved to correspond with said guide and being adapted to aline with the latter when moved to its limit in one direction, a connection between said lever and said shutter whereby the latter will be moved to open position when the said lever is alined with said guide, the said casing having a slot therein communicating with said guide, and a slide adapted for insertion in said slot and being adapted to engage and move said lever.

3. In combination with a casing adapted to contain a sensitized member, a shutter in said casing normally covering a part of the area occupied by said sensitized member, a rock lever in said casing adapted when moved in one direction to move said shutter, the said casing having a slot therein directly over said lever, a slide for insertion in said slot, the said slide having a translucent portion of substantially the same size as said shutter, and the remainder of said slide being opaque.

4. In combination with a camera adapted to contain a sensitized member, posts at the ends of the focal area of said camera and having their adjacent faces provided with grooves disposed longitudinally thereof, a rock lever in said camera beyond one of said posts and having a groove adapted to aline with the groove in said post when the lever is moved to its limit in one direction, a shutter normally protecting from light a part of the area occupied by said sensitized member, a connection between said rock lever and said shutter whereby the latter will be opened when the said lever has its groove alined with the groove in said post, and a slide designed to be inserted in said camera, and to engage in the grooves in said lever and posts.

5. In combination with a camera adapted to contain a sensitized member, a rock lever in said camera and having a groove therein, a shutter normally closing a part of the area occupied by said sensitized member, a connection between said lever and said shutter whereby the latter will be moved to open position when the lever moves in one direction, and a slide adapted to be inserted in said camera and to engage in the groove of said lever.

6. In combination with a camera adapted to contain a sensitized member, the said camera adapted to receive an inscription carrying slide, a rock lever in said camera normally disposed in the path of movement of said slide, a shutter in said camera, a spring normally holding said shutter in closed position over a part of the area occupied by the sensitized member, and a cord connecting said lever and said shutter whereby the latter will be moved to open position when the rock arm has been moved in one direction.

In testimony whereof I affix my signature in presence of two witnesses.

ALFRED C. MOSS.

Witnesses:
A. F. RICHEY,
J. H. KNAUSS.